H. M. PEIGHTEL.
LOADING AND UNLOADING APPARATUS.
APPLICATION FILED JUNE 19, 1914.
1,168,925.
Patented Jan. 18, 1916.
4 SHEETS—SHEET 3.
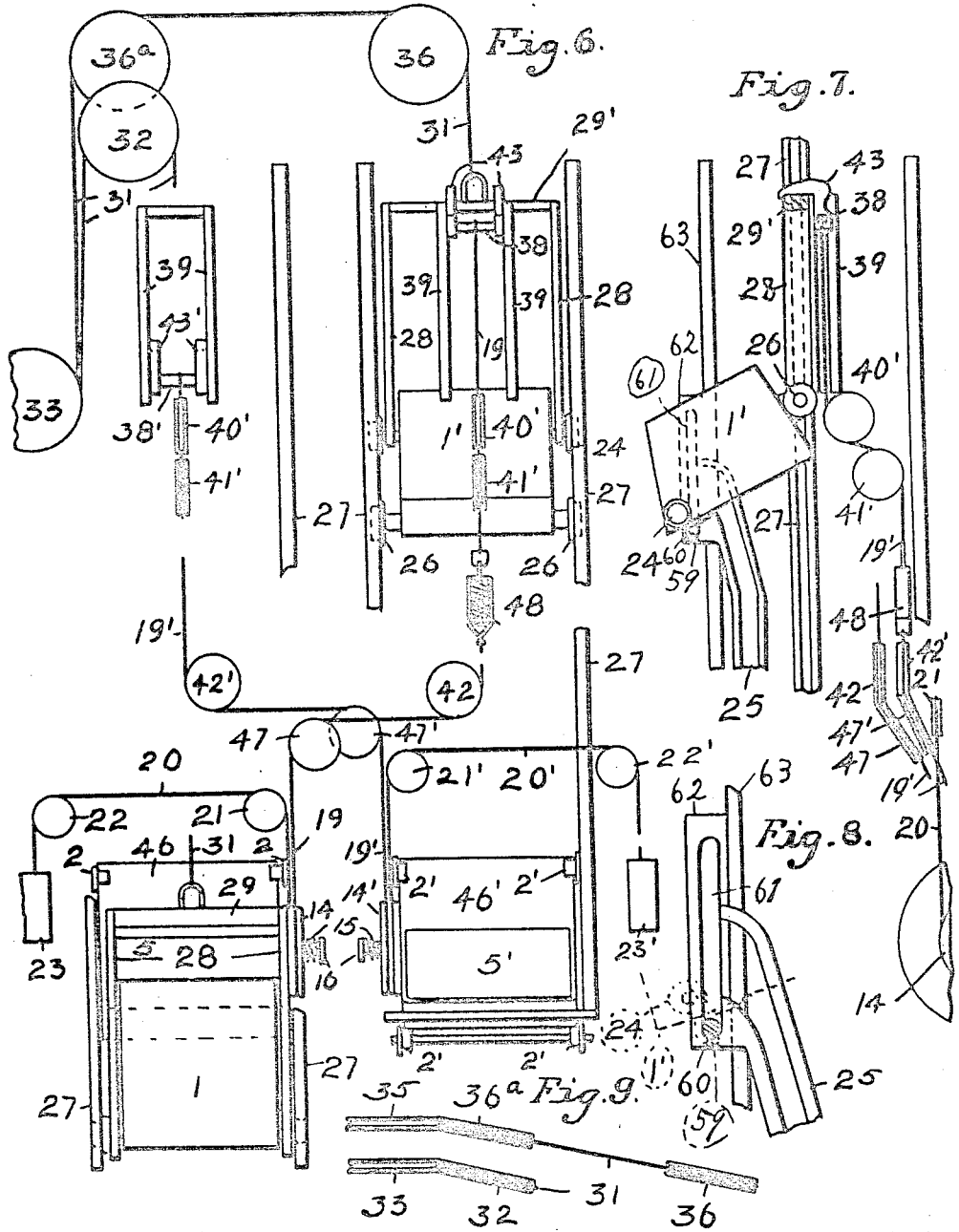
WITNESSES:
INVENTOR.
H. M. Peightel
BY F. N. Barber
ATTORNEY.

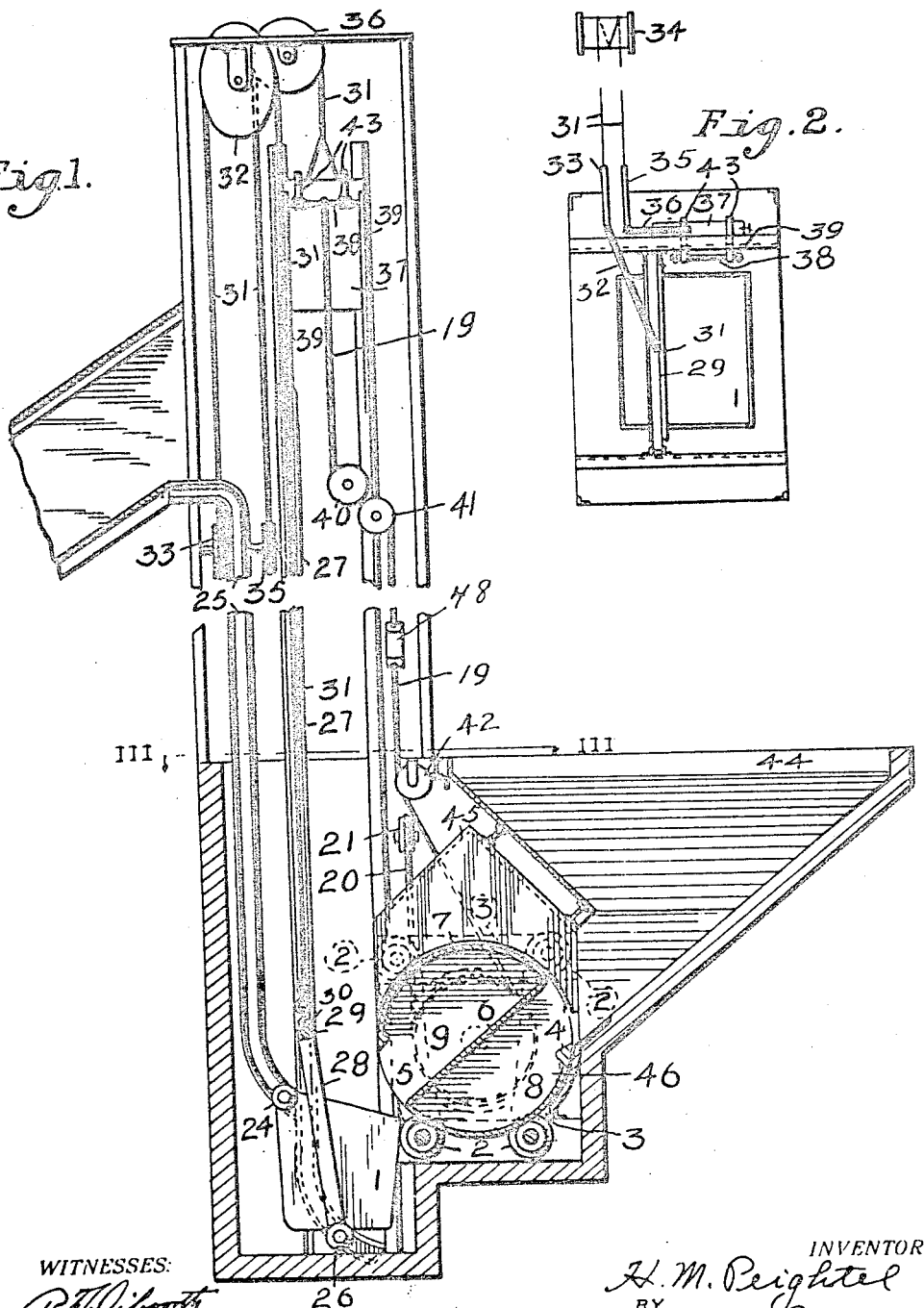

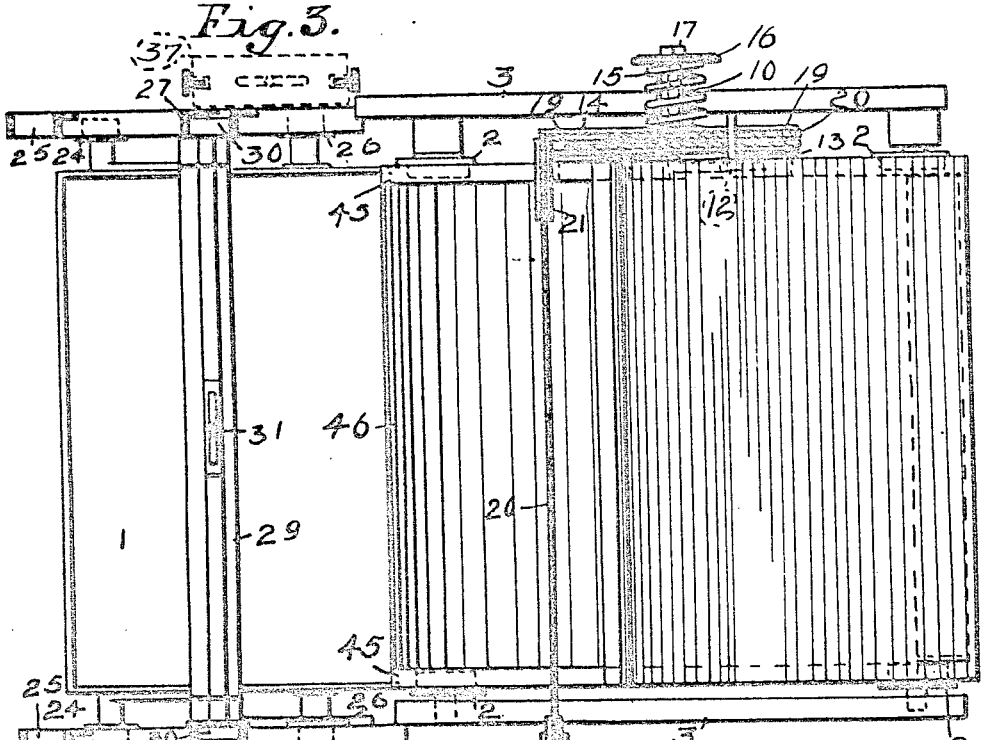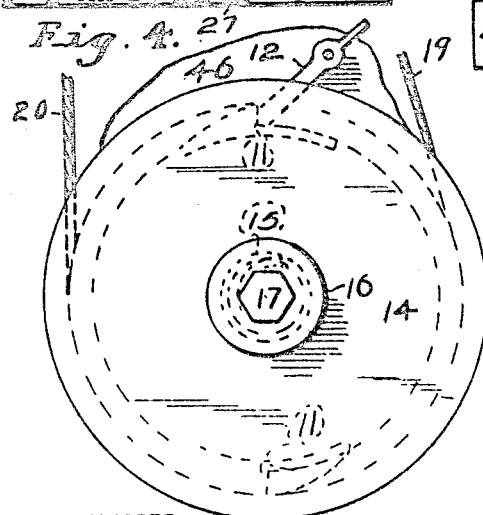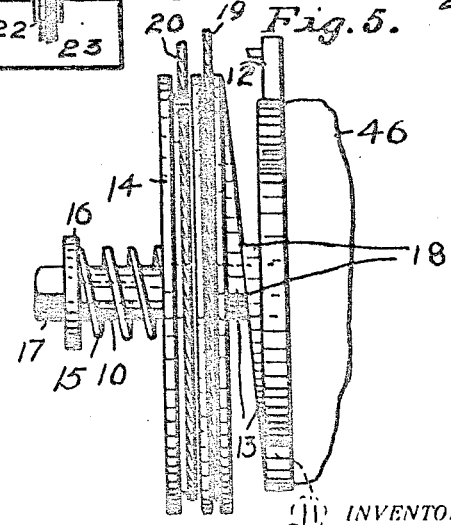

H. M. PEIGHTEL.
LOADING AND UNLOADING APPARATUS.
APPLICATION FILED JUNE 19, 1914.

1,168,825.

Patented Jan. 18, 1916.
4 SHEETS—SHEET 4.

WITNESSES

INVENTOR
H. M. Peightel
by F. N. Barber
attorney

UNITED STATES PATENT OFFICE.

HOWARD M. PEIGHTEL, OF CRAFTON, PENNSYLVANIA, ASSIGNOR TO DES MOINES BRIDGE AND IRON WORKS, OF PITTSBURGH, PENNSYLVANIA, A CORPORATION OF IOWA.

LOADING AND UNLOADING APPARATUS.

1,168,825.  Specification of Letters Patent.   Patented Jan. 18, 1916.

Application filed June 19, 1914. Serial No. 846,073.

*To all whom it may concern:*

Be it known that I, HOWARD M. PEIGHTEL, a citizen of the United States, residing at Crafton, in the county of Allegheny and State of Pennsylvania, have invented new and useful Improvements in Loading and Unloading Apparatus, of which the following is a specification.

My invention relates generally to apparatus by which quantities of material, preferably first measured, are hoisted and discharged at a predetermined place.

It is one of the objects of my invention to provide means for deflecting a hoisting bucket when near its lower limit so that it may come to rest close to, and vertically under the periphery of a rotatable delivery drum or cylinder, in order that the latter may, without embodying any delivery chute in its construction, discharge its contents or the contents of a compartment thereof into the bucket.

Another object is to provide means whereby quantities of two or more separated materials may be delivered by the drum or cylinder into distinct compartments of the hoisting bucket.

A still further object is to provide a novel means for causing the drum or cylinder to move into discharging position when the bucket is at or near its lower limit. I also provide a novel means for permitting the bucket to overtravel at its upper limit without any danger to the apparatus or any resulting annoyance. Preferably my delivery drum rotates always in the same direction, and my invention comprises novel means for driving the drum intermittently.

My invention comprises a novel construction whereby the function of the counter-weight used with a single hoisting bucket may be performed by the employment of an additional hoisting bucket. Other minor objects will appear hereinafter.

Figure 10:
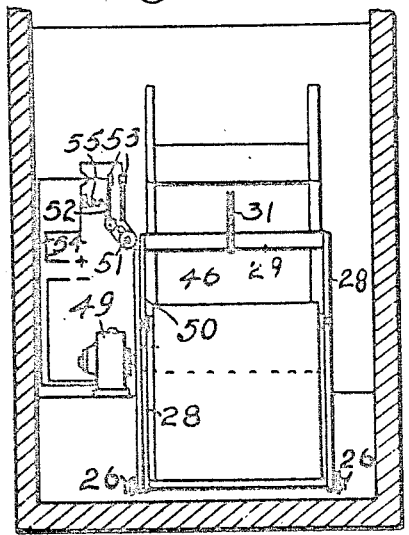
Figure 11:
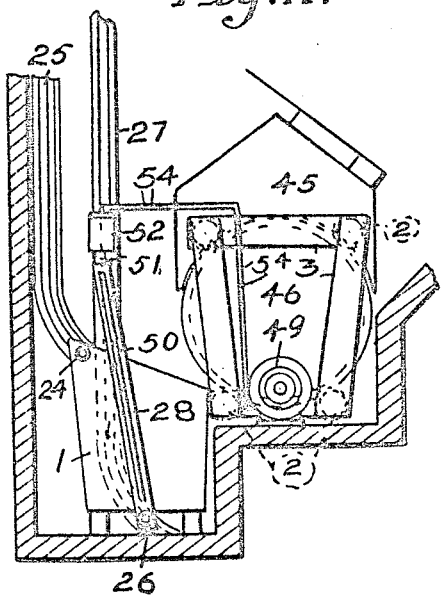
Figure 12:
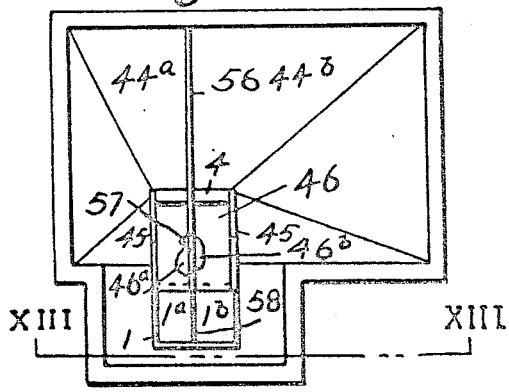

Referring to the accompanying drawings, Figure 1 is a vertical sectiton of an apparatus embodying one of the many forms which my invention may take; Fig. 2, a plan of Fig. 1 with parts to the right of the upper end of the frame omitted; Fig. 3, a horizontal section looking down from the line III on Fig. 1, parts to the right of the drum being omitted; Fig. 4, an elevation of the delivery-drum driving-wheel and adjacent devices; Fig. 5, a side elevation of Fig. 4; Fig. 6, a view, largely diagrammatic, showing my invention applied to two hoisting buckets, one serving as a counter-weight for the other; Fig. 7, a vertical section showing means for permitting an overtravel of the hoisting bucket at its upper limit; Fig. 8, an enlarged detail of Fig. 7; Fig. 9, a plan showing the arrangement of the upper sheaves on Fig. 6; Fig. 10, an elevation showing the drum operated by a separate electric motor; Fig. 11, a view of Fig. 10 rotated 90° toward the observer; Fig. 12, a view showing a modification whereby the drum and bucket may handle a number of separated materials; and Fig. 13, a section on the line XIII—XIII, Fig. 12.

Referring first to Figs. 1 to 5, 46 designates a horizontal delivery drum or cylinder having each end resting on the flanged rollers 2 supported on the quadrilateral frame 3. At each end of the drum 46 I provide two additional flanged rollers 2 which roll in contact with the upper peripheral portion of the drum. The four rollers at each end of the drum are arranged at the corners of the quadrilateral frame 3 with the periphery of the drum in rolling contact with the peripheries of the rollers and the ends of the drum in contact with or close to the roller flanges which prevent any material longitudinal movement of the drum. The rollers 2 are so arranged that a line connecting the centers of any two adjacent rollers is shorter than the diameter of the drum or forms a chord of the drum which insures that the drum cannot move laterally between adjacent rollers.

The drum 46 has two diametrically opposite longitudinal openings 4 and 5. The partition 6 extends centrally through the drum from one end thereof to the other, and is joined laterally to the periphery 7 of the drum at one of the edges of each of the openings 4 and 5, whereby the drum is divided into two measuring compartments 8 and 9, each embracing substantially one half of the drum. I do not, however, limit my invention to any definite number of longitudinal compartments.

One end of the drum is provided externally with the disk 13 having therein diametrically opposite notches 11. The frame 3 has mounted thereon the pivoted pawl 12 which engages with one or the other of the notches 11 to prevent the drum from rotating in the wrong direction, which is in the present case from left to right, or in a clock-wise direction.

A stud 10 integral with the disk 13 extends out axially beyond the disk. The drum-wheel or sheave-wheel 14 is loosely mounted on the stud 10 immediately beyond the member 13 and is yieldingly pressed toward the latter by the spiral expansion spring 15 which encircles the said stud and is confined thereon by the terminal head or washer 16, secured to the stud by the bolt 17. The opposing faces of the member 13 and the drum-wheel 14 are provided with clutch-teeth 18 which permit the drum-wheel to rotate in one direction independently of the drum, but cause the drum to be rotated with the drum-wheel when the latter is rotated in the opposite direction. The clutch teeth are inclined transversely of the stud so as to permit the drum-wheel to ride upon the inclined surfaces of the teeth on the member 13 when the drum-wheel is rotated, in the present case, from left to right, the spring 15 yielding as the drum-wheel is moved outwardly on the stud 10 and moving the drum-wheel 14 toward the member 13 when the clutch-teeth reach the ends of their inclined portions, causing the clutch-teeth on the member 13 and the wheel 14 to become again interlocked.

The periphery of the drum-wheel is provided with the two ropes or cables 19 and 20, the former wound thereon so as to rotate the drum from right to left, and the other so as to rotate the drum-wheel 14 from left to right. The rope 20 passes over the two sheaves 21 and 22 and has the weight 23 suspended on the end thereof.

The upper rear corners of the bucket 1 support the two rollers 24 which have travel between the pairs of vertical guides 25. The lower portion of the bucket is provided with a pair of rollers 26, one on each side thereof, which have travel in the pairs of vertical guides 27 which stand between the guides 24 and the drum 46. The lower ends of the guides 25 and 27 are curved toward the bucket (to the right in the present case) so as to cause the bucket to travel downwardly and toward the drum, with its upper front edge following more or less closely the curvature of the drum and so as to cause, at least, the front portion of the open upper end of the bucket to come to rest at its lower limit vertically beneath the rear portion of the drum. When the bucket is at its bottom limit of travel (Fig. 1), the opening 4 or 5 is so positioned by the pawl 12 and by the action of the rope 19 as to allow the material in the compartment 8 or 9 to be discharged by gravity into the bucket.

The bucket 1 is provided with a bail having the side members 28 and the cross-bar 29 connecting the said members together at their upper ends, their lower ends being connected to the bucket or the studs thereon which support the rollers 26. The ends of the cross-bar 29 or the upper ends of the bail are provided with rollers 30 having travel in the guide 27.

To the middle of the bar 29, I attach the hoist rope or cable 31, which passes up over the skewed sheave 32, then under the idler sheave 33, and then around the hoisting drum 34, driven by any convenient means. From the drum 34 the rope 31 passes under the sheave 35 and then over the sheave 36. The end of the rope 31 beyond the sheave 36 supports the counter-weight 37.

38 is a horizontal bar having vertical travel in the guides 39. To this bar I secure the upper end of the rope 19 which runs under the idler 40, over the idler 41, and on the idler 42. The bar 38 is arranged near the upper limit of travel of the weight 37 and close thereto and has secured thereon a pair of hook-members 43 which lie in the path of the weight 37 and are engaged and lifted thereby when the bucket 1 is approximately opposite the drum 46, the arrangements of the parts being such that when the bucket has reached its lower limit of travel (Fig. 1) the weight 37 has, by means of the hook-members 38 and rope 19, caused the drum 46 to be rotated from right to left a half revolution, causing, for example, the opening 4 of the compartment 8 to be brought to the position occupied by the opening 5 on Fig. 1, so that the contents of the said compartment may be discharged into the bucket 1. In the meantime the opening 5 has been brought to the position where the opening 4 is, so that the compartment 9 may be filed from the hopper 44. The material which may stand above the opening 4 or 5 during the rotation of the drum is confined between the stationary plates 45 at each end of the drum and above the same.

It will be noted that the openings 4 and 5 are alternately below the horizontal level of the axis of the drum when the bucket is in its lowest position, the partition 6 then being inclined toward the bucket at such an angle as to cause the contents of the corresponding compartment to be discharged completely and quickly.

Referring now to Figs. 6 to 9, I show, in a somewhat diagrammatic manner, a duplex hoisting arrangement wherein each bucket acts as a counterweight to the other. The hoisting buckets 1 and 1' are attached to the opposite ends of the hoisting rope or cable 31, the bucket 1' performing the functions of the weight 37 (Figs. 1 and 2). In Fig. 6, the left-hand bucket 1 is shown at its lower limit and the right-hand bucket 1' is shown at its upper limit and in dumping position. The hooks 43 have been engaged by the cross-bar 29' of the bail, which acts like the weight 37 (Figs. 1 and 2) to pull up the rope 19 and cause the drum 46 to be rotated so as to bring the filled compartment therein into position to be discharged into the bucket 1. This operation is the same as that described for Figs. 1 to 5, except the second bucket performs the functions of the counter-weight 37 in addition to the hoisting functions. The rope 19 passes over an additional sheave 47 and thence under the sheave 42 as in Fig. 1. When the bucket 1' is lowered and the bucket 1 is raised, the latter when near its upper limit engages the hooks 43' and causes the rope 19' to rotate the drum 46' so as to cause it to discharge the contents of one of its filled compartments into the bucket 1', which has moved in the meantime at its lower limit ready to receive a fresh supply of material from the drum 46'. The clutch disk or drum-wheel 14 is reset by the weight 23 as in Figs. 1 to 5, the bar 29' having moved down with the bucket 1' thereby making the rope 19 slack, so that it may be rewound on the wheel 14. When the bucket 1 is lowered, the weight 23' causes the drum-wheel 14' to rewind thereon the slack rope 19' and the bar 29' again engages the hooks 43 in order to move the drum 46 to discharge the other compartment to discharging position. 48 represents a shock absorber of any improved design to prevent too violent a shock to the ropes when the hooks 43 and 43' are engaged by the weight 37 or the bars 29 and 29'.

Referring now to Figs. 10 and 11, I show the drum 46 provided with the electric motor 49 for rotating it from one discharging position to another, the motor taking the place of the ropes 19 and 20 and the sheaves and other devices with which they coöperate in Figs. 1 to 5. One of the sides 28 of the bail is provided with the longitudinal rib 50, whose lower end engages the roller 51 on the lower end of the switch 52 and causes it to close the contacts 53 in the motor circuit indicated by the wires 54. The rib 50 is located so as to cause the motor to start when the bucket 1 is near its lower limit and is of such length as to maintain the switch closed long enough to rotate the drum the required number of degrees to bring it to a position to discharge its contents into the bucket. When the rib 50 passes beneath the roller 51, the spring 55 opens the switch and the motor stops. When the bucket ascends the rib 50 pushes the roller 51 up and laterally in the slot so that the switch remains open.

Figure 13:
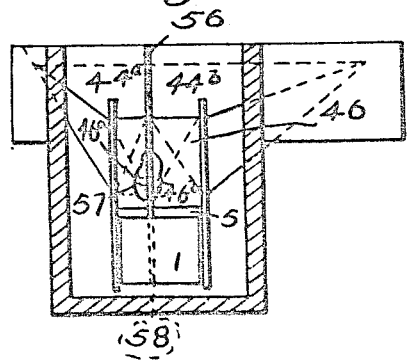

In Figs. 12 and 13, I show the hopper divided by the partition 56 transversely into the two parts 44$^a$ and 44$^b$. The drum 46 is divided by the partition 57 into compartments 46$^a$ and 46$^b$. The bucket is divided by the partition 58 into compartments 1$^a$ and 1$^b$. The said three partitions are arranged in the same transverse line so that material, such as sand in the compartment 44$^a$ is all delivered consecutively to the compartments 46$^a$ and 1$^a$, and the material, such as coal, is all delivered from the hopper compartment 44$^b$ to the compartments 46$^b$ and 1$^b$. The hopper, drum, and bucket may be divided into any desired number of compartments to correspond to the number of materials to be hoisted in separated conditions.

Referring now to Figs. 7 and 8, I have shown the bucket 1' in dumping position, that is, with its top guided laterally by the upper curved end of the guides 25 while its bottom is still guided vertically above the top, so that material in the bucket will flow down the inclined front side of the bucket and out of its open top. The front of the bucket near the top is provided with one or more hooks 59 with their concave or hollow side toward the bottom of the bucket. The horizontal bar or roller 60 is normally seated at the bottom of the vertical slots 61 in flanges 62 on the front of the vertical frame pieces 63. The guide 25 has its forward side extend up past the roller 60 and sufficiently distant therefrom to permit the hook 59 to pass above the roller. The hook 59 will pass somewhat beyond the roller until the bucket becomes horizontal. As the rollers 26 pass up the guides 27 and cause the bucket to tilt, the hook 59 moves back toward the guide 25 and engages the roller 60. If the bucket should overtravel, that is, pass up beyond the position shown, the hook will draw the roller up in the slots 61 and thereby prevent the top of the bucket from being drawn back of the vertical plane beyond which the bucket should discharge its contents. The bar or roller 60 prevents the bucket being drawn up so far as to cause the bucket to be suspended with its top downward. The hook 59 and the bar 60 prevent violent shocks to the hoisting apparatus and hold the bucket so that it will not spill its contents down the elevator shaft when an overtravel occurs, and keep the bucket so its rollers 24 will reënter the guides 25 when the bucket is lowered.

I have shown and described my invention in its preferred forms, but I do not desire to be limited to the particular elements and combinations shown and described, as other elements and combinations may be used without departing from the spirit thereof.

I claim—

1. In a loading and unloading apparatus, a horizontal rotatable drum, a hoisting-bucket arranged to receive material from the drum, a hoisting mechanism connected to the hoisting-bucket, means including a clutch device operated by the said mechanism for rotating the bucket always in the same direction, and means for returning the said clutching device to its initial position after each operation of the drum.

2. In a loading and unloading apparatus, a horizontal rotary drum, a hoisting bucket arranged to receive material from the drum, a counter-weight for the bucket, a cable connecting the bucket and the counter-weight, means for operating the cable, a clutching device for rotating the drum, means actuated by the counter-weight for driving the clutching device in a direction to deliver material from the drum to the bucket, and means for causing the clutching device to resume its initial position after each operation of the drum.

3. In a loading and unloading apparatus, a horizontal rotary drum, having a peripheral opening, a hoisting bucket arranged to receive material from the drum when the latter has been rotated so as to discharge material therefrom through the said opening and into the bucket, means for hoisting the bucket, and means controlled by the hoisting mechanism for automatically rotating the drum always in the same direction from charging position to discharging position.

4. In a loading and unloading apparatus, a horizontal drum rotatable in one direction only, a hoisting mechanism including a hoisting bucket arranged to receive material from the drum, and means controlled by the said mechanism for causing the drum to move from charging position to discharging position.

5. In a loading and unloading apparatus, a pair of hoisting buckets, each serving as a counter-weight for the other, separate drums rotatable in one direction only and arranged to receive material in one position and to deliver the same to their respective buckets when rotated to another position, a clutching device for driving each drum in the said one direction, means for simultaneously hoisting one bucket and lowering the other, means whereby the drum for supplying one bucket is rotated by the other bucket to discharging position when the latter bucket is at or near its upper limit of travel.

6. In a loading and unloading apparatus, a hoisting cable, a hoisting bucket and a counter-weight therefor connected to the cable, a drum rotatable to supply material to the bucket, and a pick-up mechanism engageable by the counter-weight in its upward travel and adapted to rotate the drum.

7. In a loading and unloading apparatus, a hoisting cable, a hoisting bucket and a counter-weight therefor connected to the cable, a drum rotatable to supply material to the bucket, a pick-up mechanism engageable by the counter-weight in its upward travel and adapted to rotate the drum, an oscillatory driving device for the drum between the latter and the pick-up mechanism, and means for returning the pick-up mechanism and the driving device to their initial positions when the counter-weight is lowered.

8. In a loading and unloading apparatus, an open-top hoisting bucket, means for guiding its bottom upwardly and its top laterally to discharging position, a hook on the forward side of the bucket, a vertically-movable cross-bar beyond which the hook passes when the bucket moves to the said position and with which it engages when the bucket overtravels.

Signed at Pittsburgh, Pa., this 18th day of June, A. D. 1914.

HOWARD M. PEIGHTEL.

Witnesses:
F. N. BARBER,
SUZANNE S. BEATTY.

Copies of this patent may be obtained for five cents each, by addressing the "Commissioner of Patents, Washington, D. C."